United States Patent [19]

Grigsby, Jr. et al.

[11] Patent Number: 4,742,091
[45] Date of Patent: May 3, 1988

[54] RIM ELASTOMER

[75] Inventors: Robert A. Grigsby, Jr., Georgetown; David R. McCoy, Austin, both of Tex.

[73] Assignee: Texaco Inc., White Plains, N.Y.

[21] Appl. No.: 896,141

[22] Filed: Aug. 13, 1986

[51] Int. Cl.$^4$ .............................................. C08G 18/30
[52] U.S. Cl. ...................................... 521/163; 528/49; 528/167
[58] Field of Search .................. 521/163; 528/49; 528/167

[56] References Cited

U.S. PATENT DOCUMENTS

| | | |
|---|---|---|
| 4,396,729 | 8/1983 | Dominguez et al. |
| 4,433,067 | 2/1984 | Rice et al. |
| 4,444,910 | 4/1984 | Rice et al. |
| 4,530,941 | 7/1985 | Turner et al. ..................... 521/163 |
| 4,550,153 | 10/1985 | Carver ............................... 521/163 |
| 4,585,850 | 4/1986 | Dominguez. |

FOREIGN PATENT DOCUMENTS

081701A1 11/1982 European Pat. Off. .

OTHER PUBLICATIONS

Foley, John; Surfactants, May 1978, pp. 46–47, *Plastics Engineering*, May 1978.
C.A. 103:55263p, Asahi Glass Co., Ltd. (Japan) Mar. 1985.
C.A. 103:38515e, Jpn. Kokai Tokkyo Koho JP 60 81,220, May 1985.

*Primary Examiner*—John Kight
*Assistant Examiner*—S. A. Acquah
*Attorney, Agent, or Firm*—Jack H. Park; Kenneth R. Priem

[57] ABSTRACT

This invention relates to reaction injection molded elastomers derived from high molecular weight amine terminated polyethers, a chain extender, an aromatic polyisocyanate and an aditive comprising an amine of the general formula

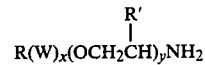

wherein R is selected from the group consisting of alkyl and alkylphenyl each of 8 to 30 carbon atoms, W is $OCH_2CH_2$ and/or $OCH_2CH(CH_3)$, R' is methyl or ethyl, x ranges from 0 to 50, and y ranges from 0 to 14.

4 Claims, No Drawings

RIM ELASTOMER

BACKGROUND OF THE INVENTION

1. Field of the Invention

This invention concerns the field of reaction injection molded elastomers.

Reaction injection molded elastomers make excellent molded parts useful, for example, in the automobile industry as exterior parts for vehicles.

2. Description of Related Publications

U.S. Pat. Nos. 4,396,729; 4,444,910 and 4,433,067 concern elastomers prepared using a high molecular weight amine terminated polyether, an aromatic diamine chain extender and an aromatic polyisocyanate which may merely be a polyisocyanate or a quasi-prepolymer prepared from a polyol reacted with a polyisocyanate wherein some isocyanate groups are still left unreacted. Various patents have been applied for and received using the basic combination recited above as well as various mold release agents and other additives, for example, catalysts.

U.S. Pat. 4,585,850 concerns and claims a reaction injection molded elastomer made by reacting in a closed mold amine terminated polyethers of greater than 1500 average molecular weight, having greater than 50% of their active hydrogens in the form of amine hydrogens, a chain extender, flaked glass pretreated with amino silane coupling agent, and an aromatic polyisocyanate. The U.S. Pat. No. 4,585,850 referred to above contains a discussion of other applications and patents in the field and is incorporated herein by reference.

European Patent Application No. 81,701A concerns reaction injection molded elastomers where fatty acid salts are recommended internal mold release agents. The corresponding U.S. application Ser. No. 443,444, filed 11/22/82, now abandoned is the subject of interference proceedings with the U.S. Pat. Nos. 4,396,729, 4,444,910 and 4,433,067 referred to above (Interference Nos. 101,393; 101,394; and 101,395).

An article in *Plastics Engineering* (May 1978) by John Foley of Witco Chemical Corp. discusses the use of surfactants as internal mold release agents.

C. A. 103:55263p, Asahi Glass Co. Ltd. (Japan) discusses mold release agents in microcellular urethane elastomers.

C. A. 103:38515e, Jpn. Kokai Tokkyo Koho JP 60 81,220 (85 81,220) Asahi Glass Co. Ltd. (Japan) discusses nonionic surfactants as internal mold release agents for polyurethane elastomers.

We have found that many advantages can be obtained by an additive to be discussed below which is an amine based on a mixture of alkylene oxides.

SUMMARY OF THE INVENTION

The invention is a reaction injection molded elastomer made by reacting in a closed mold amine terminated polyethers of greater than 1500 average molecular weight, having greater than 50% of their active hydrogens in the form of amine hydrogens, a chain extender, an aromatic polyisocyanate and an amine of the general structure

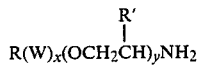

wherein R is selected from the group consisting of alkyl and alkylphenyl each of 8 to 30 carbon atoms, W is $OCH_2CH_2$ and/or $OCH_2CH(CH_3)$, R' is methyl or ethyl, x ranges from 0 to 50, and y ranges from 0 to 14.

DESCRIPTION OF THE PREFERRED EMBODIMENTS

Amine terminated polyethers including primary and secondary amine terminated polyether polyols of greater than 1500 average molecular weight having from 2 to 6 functionality, preferably from 2 to 3, and an amine equivalent weight from about 750 to about 4000 are useful in this invention. Mixtures of amine terminated polyethers may be used. In a preferred embodiment the amine terminated polyethers have an average molecular weight of at least 2,500. These materials may be made by various methods known in the art.

The amine terminated polyether resins useful in this invention, for example, are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by prior art techniques, for example, as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used.

The aromatic diamine chain extenders useful in this invention include, for example, 1-methyl-3,5-diethyl-2,4-diaminobenzene, 1-methyl-3,5 diethyl-2,6-diaminobenzene (both of these materials are also called diethyltoluene diamine or DETDA), 1,3,5-triethyl-2,6-diaminobenzene, 3,5,3',5'-tetraethyl-4,4'-diaminodiphenylmethane and the like. Particularly preferred aromatic diamine chain extenders are 1-methyl-3,5-diethyl-2,4-diaminobenzene or a mixture of this compound with 1-methyl-3,5-diethyl-2,6-diaminobenzene. It is within the scope of this invention to include some aliphatic chain extender materials as described in U.S. Pat. Nos. 4,246,363 and 4,269,945.

Other chain extenders which find use in the method of this invention are low molecular weight polyoxyalkylene polyamines which contain terminal amine groups and are represented by the formula

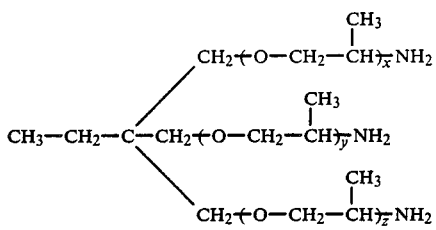

wherein x+y+z has a value of about 5.3. The average amine hydrogen equivalent weight is about 67 and the product is commercially available from Texaco Chemical Company as JEFFAMINE ® T-403. Another related polyoxypropylene polyamine is represented by the formula

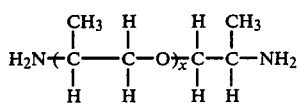

wherein x has a value of about 5.6. This product has an average amine hydrogen equivalent weight of about 100 and is commercially available from Texaco Chemical Company as JEFFAMINE D-400. The product having the same formula as above wherein x has an average value of about 2.6 is also useful. This product has an average amine hydrogen equivalent weight of about 57.5 and is commercially available from Texaco Chemical Company as JEFFAMINE D-230.

Other chain extenders will be apparent to those skilled in the art and the above recitation is not intended to be a limitation on the invention claimed herein.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyanatophenyl)methane, bis(3-methyl-4-isocyanatophenyl)methane, and 4,4-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts.

Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. are useful. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally, uretonimine modified pure MDI is included also. This product is made by heating pure distilled MDI in the presence of a catalyst. The liquid product is a mixture of pure MDI and modified MDI:

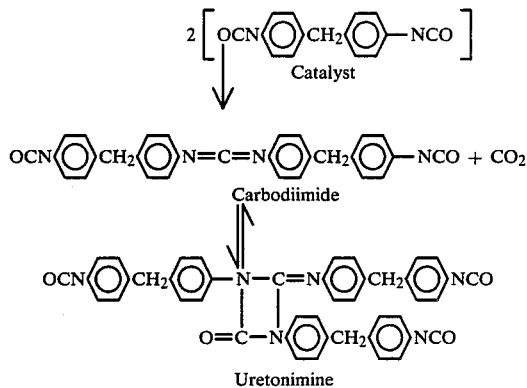

Examples of commercial materials of this type are Upjohn's ISONATE ® 125M (pure MDI) and ISONATE 143L ("liquid" MDI). Preferably the amount of isocyanates used is the stoichiometric amount based on all the ingredients in the formulation or greater than the stoichiometric amount.

Of course, the term polyisocyanate also includes quasiprepolymers of polyisocyanates with active hydrogen containing materials.

If needed, the following catalysts are useful. Catalysts such as tertiary amines or an organic tin compound or other polyurethane catalysts are used. The organic tin compound may suitably be a stannous or stannic compound such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g., trimethylamine, triethylamine); heterocyclic amines, such as N-alkyl-morpholines (e.g., N-methylmorpholine, N-ethylmorpholine, dimethyldiaminodiethylether, etc.), 1,4-dimethylpiperazine, triethylenediamine, etc.; and aliphatic polyamines such as N,N,N'N'-tetramethyl-1,3-butanediamine.

Other conventional formulation ingredients may be employed as needed such as; for example, foam stabilizers, also known as silicone oils or emulsifiers. The foam stabilizers may be an organic silane or siloxane. For example, compounds may be used having the formula:

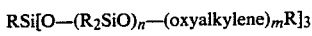

RSi[O—(R$_2$SiO)$_n$—(oxyalkylene)$_m$R]$_3$ wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

We have found that certain additives of the generic structure

R(W)$_x$(OCH$_2$CH)$_y$NH$_2$
       |
       R' wherein R is selected from the group consisting of alkyl and alkylphenyl each of 8 to 30 carbon atoms, W is OCH$_2$CH$_2$ and/or OCH$_2$CH(CH$_3$), R' is methyl or ethyl, x ranges from 0 to about 50, and y ranges from 0 to about 14 can be used in RRIM to improve various properties, including the surface wetting of filler material, for example, glass. It has been found that common mold release agents such as zinc stearate are made more soluble in these systems when used in conjunction with the above amines. The use of the above amines also improves blowing of the reacting mixture, thus making a more uniformly blown RIM part.

Preferred compounds include those where y ranges from at least 1 to about 14. Especially preferred are the compounds where y is 1 to about 3.

The selection of R will be apparent to those skilled in the art. Preferred moieties in this invention for R are, for example, CH$_3$—(CH$_2$)$_z$CH$_2$— where z ranges from about 6 to 28 and/or

Especially preferred are amine additives useful in this invention include compounds of the following structures:

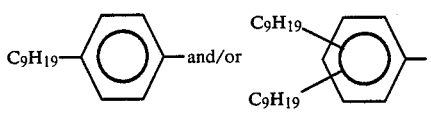

where x ranges from about 1 to about 10 and

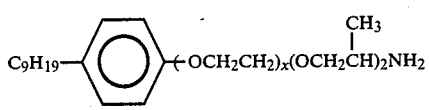

where x ranges from about 1 to about 40.

The amount of the above described amine additives to be used in the RIM formulations of this invention should be effective to dissolve the internal mold release agent, e.g. zinc stearate and effective to improve the gassing or blowing of the reacting mixtures so as to result in a more uniformly blown RIM part but not so much as to promote premature degassing of the reactive mixtures or unreacted mass containing the amine additives.

The following examples will illustrate the advantages of this invention.

EXAMPLES 1–6

These examples were processed on an Accuratio VR-100 two-component RIM machine. The material was injected into a flat plaque mold measuring 18"×18"×0.125".

Example 1 is the comparison case without any surfactant in the formulation. Example 2 is the comparison case using a hydroxyl terminated surfactant. Examples 3 and 6 are examples containing amine terminated surfactants. The surfactants used in Examples 3 and 5 are based on mononoylphenol while that in Example 6 is based on tallow alcohol. The surfactant was added to the B-component tank on the Accuratio machine. All of these examples were shot on a clean mold surface (bare steel). The mold surface was cleaned prior to making the elastomer. The formulation and the number of releases off the mold are listed in Table I.

TABLE I

| Example No. | 1 | 2 | 3 | 4 | 5 | 6 |
|---|---|---|---|---|---|---|
| JEFFAMINE ® T-5000[1] | 62.33 | 62.33 | 62.33 | 62.33 | 62.33 | 62.33 |
| Diethyltoluenediamine | 17.50 | 17.50 | 27.50 | 27.50 | 27.50 | 27.50 |
| Amine additive[2] | none | | | | yes | |
| Type | | A | B | B | C | D |
| pbw | | 1.36 | 1.50 | 3.0 | 0.80 | 1.87 |
| mmoles[3] | | 2.2 | 1.7 | 3.4 | 1.6 | 2.2 |
| Quasi-prepolymer[4] | 81.90 | 81.90 | 81.90 | 81.90 | 81.90 | 81.90 |
| No. of releases | 4 | 8 | 10 | 10 | 13 | 6 |

[1]JEFFAMINE ® T-5000 is a highly aminated 5000 molecular weight propylene oxide triol.
[2]Amine Additive A is SURFONIC ® N-95, a 9.5 mole ethylene oxide (EO) adduct of nonylphenol; a product of Texaco Chemical Co. Amine Additive B is SURFONAMINE ® MNPA 860, a compound of Texaco Chemical Co. having the formula:

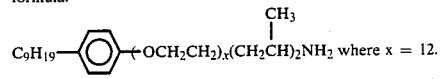

C$_9$H$_{19}$—⟨O⟩—(OCH$_2$CH$_2$)$_x$(CH$_2$CH)$_2$NH$_2$ where x = 12.
                                        |
                                        CH$_3$ Amine Additive C is SURFONAMINE ® MNPA 510 having the same general formula as B but with x = 4.
Amine Additive D was made from tallow alcohol, ethylene oxide and propylene oxide having an amine value of 1.17 meq.g.
[3]The mmoles listed here are not the actual number of mmoles used in the experiment. They are the number of mmoles used in 171.73 g of elastomer.
[4]The quasi-prepolymer was prepared from 2 pbw ISONATE 143L and 1 pbw of THANOL ® SF-5505. ISONATE 143L is a liquid MDI type isocyanate and THANOL SF-5505 is an ethylene oxide capped propylene oxide adduct of a trihydric initiator.

Conclusions from the Data

1. An increase in the number of moles of Additive B does not change the number of releases (Examples 3 and 4).

2. Additives B and C gave more releases than the hydroxyl terminated additive even when used at a lower molar concentration.

3. Additive C was the best performer as an internal mold release agent and it was also used in the lowest molar concentration.

The following examples were prepared using a Cincinnati Milacron RIM machine and a fascia mold. Example 7 uses zinc stearate as an internal mold release agent. Example 8 uses a solution of SURFONAMI- NE ® 510 and zinc stearate as the internal mold release agent.

EXAMPLE 7

To the B-component tank on the Cincinnati Milacron machine were charged JEFFAMINE ® T-5000 (62.33 pbw), diethyltoluenediamine (18.9 pbw) and zinc stearate (0.685 pbw). The B-component tank was heated to 90° C. for one hour to dissolve the zinc stearate.

A quasi-prepolymer prepared from ISONATE ® 143L and THANOL ® SF-5505 was charged into the A-component tank. The A-component temperature was adjusted to 120° F. and the B-component was adjusted to 130° F. The weight ratio was adjusted to 0.665 A/B at a total throughput of 6.0 lb/sec and about 2,000 psi injection pressure. The components were injected into a clean (bare steel) fascia tool. Good release was seen with this internal mold release agent; however, overpacking of the license area* in the fascia part was seen. Adjusting the injection rate to 7.5 lb/sec still showed overpacking of the license area. The properties of the formulation are listed in Table 2.

*License area refers to the area near the entry port of the mold cavity.

EXAMPLE 8

To the B-component tank on the Cincinnati Milacron machine were charged JEFFAMINE T-5000 (62.33 pbw), diethyltoluenediamine (18.9 pbw) and a solution (1.07 pbw) of zinc stearate (33.3%) and SURFONAMINE ® 510 (66.6%). A quasi-prepolymer prepared from ISONATE 143L and THANOL SF-5505 was charged into the A-component tank. The A-component temperature was adjusted to 123° F. and the B-component was adjusted to 130° F. The weight ratio was adjusted to 0.700 A/B at a total throughput of 6.0 lb/sec and about 2,000 psi injection pressure. The components were injected into a clean (bare steel) fascia tool. Good release was seen with this internal mold release solution. No overpacking of the license area was seen in this fascia part at an injection rate of 6.0 lb/sec as compared to Example 7. The SURFONAMINE 510 improved the blowing of the material such that overpacking did not occur. The properties of the formulations are listed in Table 2.

TABLE 2

| | Example No. | |
|---|---|---|
| | 7 | 8 |
| Shore D, instant/10 sec | 44/40 | 42/38 |
| Tensile, psi | 3090 | 3530 |
| Tear, pli | 395 | 390 |
| Elongation, % | 310 | 360 |
| Flexural modulus, psi | | |
| 77° F. | 27,100 | 25,500 |
| −20° F. | 69,200 | 67,800 |
| 158° F. | 20,200 | 21,600 |
| Heat sag, mm (250° F.) | | |
| 100 mm overhang | 5 | 4 |
| 150 mm overhang | 23 | 19 |

We claim:

1. A reaction injection molded elastomer made by reacting in a closed mold amine terminated polyethers of greater than 1500 average molecular weight, having greater than 50% of their active hydrogens in the form of amine hydrogens, a chain extender, an aromatic polyisocyanate and an effective amount of an amine additive of the general structure:

$$R(W)_x(OCH_2\overset{R'}{\underset{|}{C}H})_yNH_2$$

wherein R is selected from the group consisting of alkyl and alkylphenyl each of 8 to 30 carbon atoms, W is $OCH_2CH_2$ and/or $OCH_2CH(CH_3)$, R' is methyl or ethyl, x ranges from 0 to 50, and y ranges from at least 1 to about 14.

2. A reaction injection molded elastomer as in claim 1 wherein the amine additive has an R a hydrophobic moiety selected from the group consisting of $$CH_3-(CH_2)_z CH_2-$$

where z ranges from about 6 to 28,

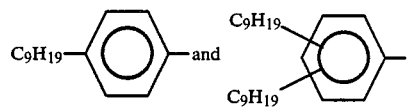

3. A reaction injection molded elastomer as in claim 1 wherein the amine additive is of the formula

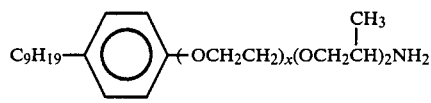

where x is about 4.

4. A reaction injection molded elastomer as in claim 1 wherein the amine additive is of the formula

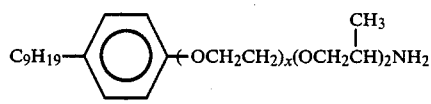

where x is about 10.

* * * * *